US009615318B2

United States Patent
Morper et al.

(10) Patent No.: US 9,615,318 B2
(45) Date of Patent: Apr. 4, 2017

(54) MULTIPLEXING CORE NETWORKS IN RAN SHARING

(75) Inventors: Hans-Jochen Morper, Erdweg (DE); Christian Markwart, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/345,428

(22) PCT Filed: Sep. 20, 2011

(86) PCT No.: PCT/EP2011/066340
§ 371 (c)(1),
(2), (4) Date: Mar. 18, 2014

(87) PCT Pub. No.: WO2013/041128
PCT Pub. Date: Mar. 28, 2013

(65) Prior Publication Data
US 2014/0348068 A1    Nov. 27, 2014

(51) Int. Cl.
*H04W 4/00* (2009.01)
*H04W 48/18* (2009.01)
(Continued)

(52) U.S. Cl.
CPC ........... *H04W 48/18* (2013.01); *H04W 88/16* (2013.01); *H04L 29/06068* (2013.01); *H04W 92/02* (2013.01)

(58) Field of Classification Search
CPC ..... H04W 8/26; H04W 76/025; H04W 40/02; H04W 88/16; H04W 92/00; H04W 92/045; H04L 12/4662
(Continued)

(56) References Cited

U.S. PATENT DOCUMENTS

2002/0012328 A1*  1/2002  Emanuel .......... H04L 29/12216
                                                          370/328
2002/0169883 A1* 11/2002  Bright ............... H04L 29/12188
                                                          709/230
(Continued)

FOREIGN PATENT DOCUMENTS

WO     WO 02/098152 A1    12/2002

OTHER PUBLICATIONS

3GPP TR 22.951 V10.0.0 (Mar. 2011), "3$^{rd}$ Generation Partnership Project; Technical Specification Group Services and System Aspects; Service aspects and requirements for network sharing (Release 10)", 19 pgs.
(Continued)

*Primary Examiner* — Kevin C Harper
(74) *Attorney, Agent, or Firm* — Harrington & Smith

(57) ABSTRACT

An apparatus, includes core interface means adapted to provide an eastbound interface to a first core network element and to a second core network element different from the first core network element; radio interface means adapted to provide a westbound interface to a first radio access network element and to a second radio access network element different from the first radio access network element; multiplex detecting means adapted to detect if a first request received at one of the eastbound and westbound interfaces is directed to the first and/or the second of the network elements of the respective other interface; adapting means adapted to adapt the first request according to the network element to which it is directed; multiplexing means adapted to multiplex the adapted first request to the first and/or the second of the network elements of the respective other interface according to detection by the multiplex detecting means.

14 Claims, 9 Drawing Sheets

(51) Int. Cl.
*H04W 88/16* (2009.01)
*H04W 92/02* (2009.01)
*H04L 29/06* (2006.01)

(58) Field of Classification Search
USPC ............................ 370/252, 328; 455/422.1
See application file for complete search history.

(56) References Cited

U.S. PATENT DOCUMENTS

| | | | | |
|---|---|---|---|---|
| 2004/0105429 | A1* | 6/2004 | Anckar | H04W 88/10 370/352 |
| 2005/0117540 | A1* | 6/2005 | Kuchibhotla | H04W 76/021 370/329 |
| 2005/0213566 | A1* | 9/2005 | Jutila | H04W 48/18 370/352 |
| 2006/0034278 | A1* | 2/2006 | Hundscheidt | H04L 12/185 370/390 |
| 2006/0050771 | A1* | 3/2006 | Shinozaki | H04W 52/12 375/144 |
| 2009/0138577 | A1* | 5/2009 | Casado | H04L 41/06 709/220 |
| 2009/0310535 | A1* | 12/2009 | Anumala | H04W 8/26 370/328 |
| 2011/0044245 | A1* | 2/2011 | Hasegawa | H04W 88/08 370/328 |
| 2012/0120831 | A1* | 5/2012 | Gonsa | H04W 76/025 370/252 |
| 2013/0070688 | A1* | 3/2013 | Picker | H04W 88/08 370/329 |

OTHER PUBLICATIONS

3GPP TS 23.251 V11.0.0 (Sep. 2011), "$3^{rd}$ Generation Partnership Project; Technical Specification Group Services and System Aspects; Network Sharing; Architecture and functional description (Release 11)", 28 pgs.

3GPP TS 23.401 V10.5.0 (Sep. 2011), "$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)", 282 pgs.

\* cited by examiner

MULTIPLEXING CORE NETWORKS IN RAN SHARING

FIELD OF THE INVENTION

The present invention relates to an apparatus, a method, a system, and a computer program product related to radio access network (RAN) sharing. More particularly, the present invention relates to an apparatus, a method, a system, and a computer program product for connecting several core networks to a RAN network in a network sharing case.

BACKGROUND OF THE INVENTION

The present application is related to future radio networks, especially base stations (Macro, Pico and Femto) and the respective mobile backhaul. It covers following technology fields:
  network sharing, RAN sharing
  network virtualization Currently, cloud computing, network sharing and network virtualization is one of the hottest topics for service, transport and access providers. In this context virtualization and virtualization technologies are to be seen as enabler for cloud services and network sharing.

Meanwhile, sharing of transport resources (i.e. multiple service providers share the physical resources of one or several transport providers) is already becoming reality and products are available, the next logical step is virtualization of access resources—fixed and mobile. Current solutions for sharing RAN resources like GWCN, MOCN and MORAN (see below) are deficient since they require tight interworking of operators—excluding business models that allow sharing with sharing operators being agnostic of one another, especially those cases, where one operator serves as access provider for a multitude of third party operators. There is more and more demand for this kind of solutions, sometimes operator driven, sometimes driven by regulators.

FIG. 1 shows the principle architecture of a $4^{th}$ generation mobile network. Terminals (UE) are connected via the RAN (radio access network), comprising of eNodeB base stations through an EPC (evolved packet core) to service endpoints in the SDN (service delivery network) which most often is represented by server farms where content and services are stored/made available for UE access. In the context of this invention, an SDN shall represent an MNO services network, but also services networks of third party service providers, or even the internet. The evolved packet core mainly comprises of a mobility management entity (MME) acting as central control unit for the Radio Access Network (RAN) and gateways, namely serving gateways S-GW which mediate UE traffic from the base stations towards packet data gateways P-GW which act as transition point to SDN or other networks. The involvement of eNodeB, S-GW and P-GW is to a certain extend steered by the mobility management entity (MME).

Besides the E2E data which shall be exchanged between both peer ends (UE/SDN), denoted as U-plane further on, there is a significant exchange of mobile network control messages between nodes of the mobile network, which are not necessarily related to the services themselves (payload) but which are necessary to run an E2E service delivery. This information exchange, denoted as C-plane further on, comprises e.g. measurement reports from the UE to eNodeB and mobility management entities (MME), user/service related information between UE and a packet data gateway (P-GW), tunnel setup information between serving gateways (S-GW) and P-GW, user authentication and authorization between home subscriber systems/home location registers (HSS/HLR) and a variety of nodes. Note that this information shall not be mistaken with control messages between services and user devices (like hypertext transfer protocol (HTTP) or file transfer protocol (FTP)) and that this information is in no way related to control messages of underlying transport nodes. In the figure, nodes having control functionality are indicated with a C-triangle, those having data forwarding functionality are marked with a D-circle, and of course, some nodes have both functionalities.

With respect to transport, there is most often a clear separation of RAN and EPC. Base stations are in remote areas in rural scenarios and densely co-located in urban areas and, thus, operators have to cooperate (sites) and often have to rely on $3^{rd}$ party transport since they do not own a transport network (e.g. in rural areas). Thus, RAN transport covers the transport domains of access (passive optical network (PON)/next generation optical access (NGOA)), Metro (e.g. carrier Ethernet (CET)). Most often, RAN traffic is fed into a DWDM long haul network with (quite some) optical cross connects and then conveyed further on to the services networks, which could be Metro-like connected. Most often, on higher transport layers, eNodeB connections base on internet protocol (IP) or Ethernet, the EPC run on IP/MPLS (MPLS: Multiprotocol Label Switching). It should be noted, that the higher layer mobile network architecture typically is—to a certain extend—taking into account the disruptiveness in the underlying transport, e.g. nodes are placed at typical transition areas.

When making physical resources such as transport capacity abstractly available to higher layers (virtualization), there are some new emerging networking technologies available that are promising candidates for realization. One of these is defined in the OpenFlow consortium (www.openflow,org).

The basic idea is to (re)use commercial-off-the-shelf routing and switching platforms. In a simplified view, those already comprise of facilities (see FIG. 2) for data path handling (e.g. switching matrix), software and flow tables, which define how data packets are handled (routed, switched) depending e.g. on the information that is contained in the packet headers. A simple rule could for example mean that incoming packets on port 0 will be forwarded to port 2 if the destination address found in the header can be resolved and to port 3 otherwise.

The idea of OpenFlow is that the flow tables may be manipulated from outside via an API (OpenFlow interface) and that a control instance can slice different resources and present those, or a subset of those, to further control instances outside the box (FlowVisor). This way an application can manipulate resources of e.g. one or several Ethernet switch(es) by manipulating a flow table which is presented by an instance which could be a switch or a FlowVisor instance hiding a hierarchical structure comprising of switches and/or FlowVisor controllers. This way the application doesn't need to have the knowledge of whether its access to resources directly affects one switch or several switches which are hierarchical organized.

$3^{rd}$ generation partnership project (3GPP) technical report TR 22.951 defines the service aspects and requirements for network sharing. The common 3GPP architecture, which consists of a Radio Access Network RAN and a Core Network CN has been extended as shown in FIG. 3 to support multiple sharing scenarios.

This flexibility is needed to allow Mobile Network Operators (MNO) to adapt to regulations given by the national authorities (e.g. to prohibit national roaming). There are four possible basic sharing scenarios:

Multi Operator Radio Access Network (MORAN) (Site Sharing): MORAN can be seen as a classical site sharing which uses a single physical Base Station to support logically independent Base Stations with separated spectrum, one for each MNO;

Roaming (national and international): Roaming is operated with the spectrum of that MNO who owns the RAN (visited network). This MNO allows the subscribers of other MNOs (home network) to use its mobile resources according to specific roaming agreements;

Multi Operator Core Network (MOCN): MOCN configurations share the RAN of one MNO with several other MNOs. The core networks of the MNOs are directly connected to that RAN; and Gateway Core Network (GWCN): GWCN configurations share the RAN and core network elements of one MNO with several other MNOs.

Although network sharing and virtualization techniques are not new topics, they require that Mobile Network Operators which want to cooperate in these fields have to work closely together on regulatory, commercial and technical level. In general, a quite complex part is related to the huge number of technical details that need to be agreed between the involved MNOs (e.g. network addresses, firewall configurations, closed subscriber group identities (CSG-Ids), cell broadcasts, unique tracking area codes, security parameters, etc.).

The following example describes a typical problem based on PLMN-ID configuration for multiple MNOs in a shared radio access network (RAN). This problem is basically similar for other parameters which are used in sharing environments and/or network virtualization scenarios.

3GPP has defined in technical specification TS 23.251 two basic network sharing architectures, which allow different core network operators to connect to a shared radio access network:

Gateway Core Network (GWCN) configuration

Multi-Operator Core Network (MOCN) configuration

In the latter architecture only the radio access network RAN is shared while in the first architecture RAN and core network elements SGSN/MSC (alternatively MME/S-GW in case of EPC) are shared.

In case of RAN sharing by multiple MNOs the system information broadcast in a shared cell contains the public land mobile network identification (PLMN-ID) of each operator and a single tracking area code (TAC) valid for all involved MNOs.

The configuration of a shared network is hidden to the UE, i.e. the UE behaviour in both configurations is identical. When the UE tries to connect to the Mobile Network (RAN and CN), it has to perform the 3GPP defined procedures. These procedures are defined in a way that each UE is connected to the corresponding CN of its Mobile Operator based on the selected PLMN-ID received in the cell broadcast. This mechanism requires that a shared RAN is able to broadcast multiple PLMN-IDs, one for each involved MNO. 3GPP has introduced the "equivalent PLMN-ID" feature to support this functionality. As of today broadcast parameters are configured in the RAN via an OAM system which belongs to the MNO owning the RAN.

The other MNOs are not able to configure their parameters directly. They have to request their configuration needs offline or via higher management interfaces from the RAN Operator. A solution that allows multiple MNOs to manage the shared RAN is not feasible without further measures because the PLMN-ID is stored in a list with the other PLMN-IDs and there is a high risk that an MNO overwrites configuration parameters of another MNO and vice versa.

The additional measures required for the OAM-parameter-configuration-access for several MNOs increase with higher level of OAM automation. For example a fully automated interface has to provide a basic functionality for authentication, authorization, transaction security and overwrite protection but also additional functions like translation, adaptation and activation mechanisms which depend on the needed parameter sets and their vendor specific meaning.

FIG. 4 shows a principle architecture that could be used to enable two operators (PLMN 1, PLMN 2) to use eNodeBs of PLMN A in the same way as they use eNodeBs of their network, i.e.

they use their PLMN OAM for configuration;

they equip PLMN A eNodeB with identities that are suitable for their PLMN; and they configure PLMN A eNodeB in a way that terminals (UE1, UE2) are served in the same way as they are served in their PLMN.

Thus, the PLMN-A eNodeB would have to serve three networks, allowing OAM, C-Plane and U-Plane for three separate networks.

As discussed above, today's eNodeBs cannot cope with such a scenario without additional measures—there is a need to coordinate resource usage, to cope with contradicting OAM commands and so forth.

A simple but well established method is the offline exchange or exchange via higher management interfaces of configuration parameters (e.g. eMail, request forms, work order requests, . . . ). In case of the PLMN-ID, for example, the MNO provides the necessary PLMN-ID parameter for his CN to the RAN operator. The RAN operator then configures this PLMN-ID as equivalent PLMN-ID to the shared RAN. Of course there are solutions to automate this process outside of 3GPP standardization, but all these solutions are more or less proprietary and require a case by case integration solution. The disadvantages of existing solutions are obvious:

complex and expensive integration of OAM procedures no standardized solution to guarantee easy re-use of such integration solutions manifold interfaces with slow and lengthy test periods

SUMMARY OF THE INVENTION

It is an object of the present invention to improve the prior art.

In particular, it is provided a solution that allows to operate a RAN in such a way that third party operators may use it and virtually integrate it into their transport, control and OAM infrastructure without the need to collaborate on a deep technical level and with an (unmodified) installed base.

According to a first aspect of the invention, there is provided an apparatus, comprising core interface means adapted to provide an eastbound interface to a first core network element and to a second core network element different from the first core network element; radio interface means adapted to provide a westbound interface to a first radio access network element and to a second radio access network element different from the first radio access network element; multiplex detecting means adapted to detect if a first request received at one of the eastbound and westbound interfaces is directed to the first and/or the second of the network elements of the respective other interface; adapting means adapted to adapt the first request according to the network element to which it is directed; multiplexing means adapted to multiplex the adapted first request to the first and/or the second of the network elements of the respective other interface according to the detection by the multiplex detecting means.

In the apparatus, the adaption means may comprise interworking deciding means adapted to decide if the first request requires interworking by an interworking function; interworking means adapted to provide the interworking function for the first request dependent on the decision by the interworking deciding means.

In the apparatus, the interworking function may provide, for each of the one or more receiving network elements to which the first request is multiplexed, a transformation from a first protocol used in the received first request to a second protocol different from the first protocol used in the request multiplexed to the receiving network element.

In the apparatus, for each of the one or more receiving network elements to which the first request is multiplexed, the interworking deciding means may be adapted to base its decision on the network element from which the first request is received and on the receiving network element.

In the apparatus, the adapting means may comprise inhibiting means adapted to inhibit the multiplexing means from multiplexing the first request based on at least one of a status of the receiving network element to which the first request is directed, a previous request which was previously multiplexed to the receiving network element, and a predefined rule.

In the apparatus, the adapting means may comprise mediating deciding means adapted to decide if the first request requires mediating by a mediating function; mediating means adapted to provide the mediating function for the first request dependent on the decision by the mediating deciding means.

In the apparatus, the mediating means may be adapted to mediate the first request, for each of the one or more receiving network elements to which the first request is multiplexed, based on at least one of a status of the receiving network element, a previous request which was previously multiplexed to the receiving network element, and a predefined rule.

The apparatus may further comprise buffering means adapted to buffer the previous request until the first request is received; correlating means adapted to correlate the previous request and the first request; wherein the mediating means may be adapted to base the mediating of the first request on the previous request using the correlation by the correlating means.

In the apparatus, for each of the one or more receiving network elements to which the first request is multiplexed, the mediating deciding means may be adapted to base its decision on the network element from which the first request is received and on the receiving network element.

In the apparatus, the mediating means may be adapted to mediate the first request such that the first and second radio access network elements jointly appear as a single first virtual radio access network element to the first core network element, wherein the first request may be a request to be multiplexed between the first core network element and at least one of the first and second radio access network elements.

The apparatus may further comprise inside checking means adapted to check if the first request is related to a functionality according to which the first core network element may recognize that the first virtual radio access network element comprises the first radio access network element and the second radio access network element, wherein the first request may be directed to the first core network element; and the inhibiting means may be further adapted to inhibit the multiplexing means from multiplexing the first request to the first core network element if the result of the inside checking means is affirmative.

In the apparatus, the radio interface means may be adapted to provide the westbound interface to a third radio access network element different from the first and second radio access network elements, the multiplex detecting means may be adapted to detect if a second request received from the second core network element is directed to the first and/or the second and/or the third of the radio access network elements, and if a third request received from any of the second and third radio access network elements is directed to the first and/or the second of the core network elements; the multiplexing means may be adapted to multiplex the second request to the first and/or the second and/or the third of the radio access network elements and to multiplex the third request to the first and/or the second of the core network elements according to the detection by the multiplex detecting means; and the mediating means may be adapted to mediate the second request and, if the third request is directed to the second core network element, the third request such that the second and third radio access network elements jointly appear as a single second virtual radio access network element to the second core network element.

The apparatus may further comprise northbound interface means adapted to provide a northbound interface to a master managing device; managing means adapted to manage at least one of the multiplex detecting means, the adapting means, and the multiplexing means based on a managing request received at the northbound interface.

In the apparatus, a functionality provided by the eastbound interface and the westbound interface may comprise at least one of a user plane functionality, a control plane functionality, and an operation and maintenance functionality.

According to a second aspect of the invention, there is provided an apparatus, comprising core interface processor adapted to provide an eastbound interface to a first core network element and to a second core network element different from the first core network element; radio interface processor adapted to provide a westbound interface to a first radio access network element and to a second radio access network element different from the first radio access network element; multiplex detecting processor adapted to detect if a first request received at one of the eastbound and westbound interfaces is directed to the first and/or the second of the network elements of the respective other interface; adapting processor adapted to adapt the first request according to the network element to which it is directed; multiplexing processor adapted to multiplex the adapted first request to the first and/or the second of the network elements of the respective other interface according to the detection by the multiplex detecting processor.

In the apparatus, the adaption processor may comprise interworking deciding processor adapted to decide if the first request requires interworking by an interworking function; interworking processor adapted to provide the interworking function for the first request dependent on the decision by the interworking deciding processor.

In the apparatus, the interworking function may provide, for each of the one or more receiving network elements to which the first request is multiplexed, a transformation from a first protocol used in the received first request to a second protocol different from the first protocol used in the request multiplexed to the receiving network element.

In the apparatus, for each of the one or more receiving network elements to which the first request is multiplexed, the interworking deciding processor may be adapted to base its decision on the network element from which the first request is received and on the receiving network element.

In the apparatus, the adapting processor may comprise inhibiting processor adapted to inhibit the multiplexing processor from multiplexing the first request based on at least one of a status of the receiving network element to which the first request is directed, a previous request which was previously multiplexed to the receiving network element, and a predefined rule.

In the apparatus, the adapting processor may comprise mediating deciding processor adapted to decide if the first request requires mediating by a mediating function; mediating processor adapted to provide the mediating function for the first request dependent on the decision by the mediating deciding processor.

In the apparatus, the mediating processor may be adapted to mediate the first request, for each of the one or more receiving network elements to which the first request is multiplexed, based on at least one of a status of the receiving network element, a previous request which was previously multiplexed to the receiving network element, and a predefined rule.

The apparatus may further comprise buffering processor adapted to buffer the previous request until the first request is received; correlating processor adapted to correlate the previous request and the first request; wherein the mediating processor may be adapted to base the mediating of the first request on the previous request using the correlation by the correlating processor.

In the apparatus, for each of the one or more receiving network elements to which the first request is multiplexed, the mediating deciding processor may be adapted to base its decision on the network element from which the first request is received and on the receiving network element.

In the apparatus, the mediating processor may be adapted to mediate the first request such that the first and second radio access network elements jointly appear as a single first virtual radio access network element to the first core network element, wherein the first request may be a request to be multiplexed between the first core network element and at least one of the first and second radio access network elements.

The apparatus may further comprise inside checking processor adapted to check if the first request is related to a functionality according to which the first core network element may recognize that the first virtual radio access network element comprises the first radio access network element and the second radio access network element, wherein the first request may be directed to the first core network element; and the inhibiting processor may be further adapted to inhibit the multiplexing processor from multiplexing the first request to the first core network element if the result of the inside checking processor is affirmative.

In the apparatus, the radio interface processor may be adapted to provide the westbound interface to a third radio access network element different from the first and second radio access network elements, the multiplex detecting processor may be adapted to detect if a second request received from the second core network element is directed to the first and/or the second and/or the third of the radio access network elements, and if a third request received from any of the second and third radio access network elements is directed to the first and/or the second of the core network elements; the multiplexing processor may be adapted to multiplex the second request to the first and/or the second and/or the third of the radio access network elements and to multiplex the third request to the first and/or the second of the core network elements according to the detection by the multiplex detecting processor; and the mediating processor may be adapted to mediate the second request and, if the third request is directed to the second core network element, the third request such that the second and third radio access network elements jointly appear as a single second virtual radio access network element to the second core network element.

The apparatus may further comprise northbound interface processor adapted to provide a northbound interface to a master managing device; managing processor adapted to manage at least one of the multiplex detecting processor, the adapting processor, and the multiplexing processor based on a managing request received at the northbound interface.

In the apparatus, a functionality provided by the eastbound interface and the westbound interface may comprise at least one of a user plane functionality, a control plane functionality, and an operation and maintenance functionality.

According to a third aspect of the invention, there is provided a method, comprising providing an eastbound interface to a first core network element and to a second core network element different from the first core network element; providing a westbound interface to a first radio access network element and to a second radio access network element different from the first radio access network element; detecting if a first request received at one of the eastbound and westbound interfaces is directed to the first and/or the second of the network elements of the respective other interface; adapting the first request according to the network element to which it is directed; multiplexing the adapted first request to the first and/or the second of the network elements of the respective other interface according to the detecting.

The method may be a method of network sharing.

In the method, the adapting may comprise deciding if the first request requires interworking by an interworking function; interworking the first request by the interworking function dependent on the decision on the interworking.

In the method, the interworking function may provide, for each of the one or more receiving network elements to which the first request is multiplexed, a transformation from a first protocol used in the received first request to a second protocol different from the first protocol used in the request multiplexed to the receiving network element.

In the method, for each of the one or more receiving network elements to which the first request is multiplexed, the deciding on the interworking may be based on the network element from which the first request is received and on the receiving network element.

In the method, the adapting may comprise inhibiting multiplexing the first request based on at least one of a status of the receiving network element to which the first request is multiplexed, a previous request which was previously multiplexed to the receiving network element, and a predefined rule.

In the method, the adapting may comprise deciding if the first request requires mediating by a mediating function;

mediating the first request by the mediating function dependent on the decision on the mediating.

In the method, the mediating of the first request may be, for each of the one or more receiving network elements to which the first request is multiplexed, based on at least one of a status of the receiving network element, a previous request which was previously multiplexed to the receiving network element, and a predefined rule.

The method may further comprise buffering the previous request until the first request is received; correlating the previous request and the first request; wherein the mediating of the first request may be based on the previous request using the correlation.

In the method, for each of the one or more receiving network elements to which the first request is multiplexed, the deciding on the mediating may be based on the network element from which the first request is received and on the receiving network element.

In the method, the mediating of the first request may be such that the first and second radio access network elements jointly appear as a single first virtual radio access network element to the first core network element, wherein the first request may be a request to be multiplexed between the first core network element and at least one of the first and second radio access network elements.

The method may further comprise checking if the first request is related to a functionality according to which the first core network element may recognize that the first virtual radio access network element comprises the first radio access network element and the second radio access network element, wherein the first request is directed to the first core network element; and inhibiting multiplexing the first request to the first core network element if the result of the checking is affirmative.

The method may further comprise providing the westbound interface to a third radio access network element different from the first and second radio access network elements, detecting if a second request received from the second core network element is directed to the first and/or the second and/or the third of the radio access network elements, and if a third request received from any of the second and third radio access network elements is directed to the first and/or the second of the core network elements; multiplexing the second request to the first and/or the second and/or the third of the radio access network elements and multiplexing the third request to the first and/or the second of the core network elements according to the detecting; and mediating the second request and, if the third request is directed to the second core network element, the third request such that the second and third radio access network elements jointly appear as a single second virtual radio access network element to the second core network element.

The method may further comprise providing a northbound interface to a master managing device; managing at least one of the detecting, the adapting, and the multiplexing may be based on a managing request received at the northbound interface.

In the method, a functionality provided by the eastbound interface and the westbound interface may comprise at least one of a user plane functionality, a control plane functionality, and an operation and maintenance functionality.

According to a fourth aspect of the invention, there is provided a computer program product including a program comprising software code portions being arranged, when run on a processor of an apparatus, to perform the method according to the third aspect.

The computer program product may comprise a computer-readable medium on which the software code portions are stored, and/or wherein the program may be directly loadable into a memory of the processor.

According to embodiments of the invention, at least the following advantages are achieved:

An operator may easily share his RAN network with other operators without the need for complex agreements on the technical details and without worrying on the consistency of the configuration. Each sharing operator may configure the necessary parameters independent from the other sharing operators. No adaptations to the RAN and EPC are required. In particular, the operators may not need to care about different protocols used in the different networks and about conflicting commands.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
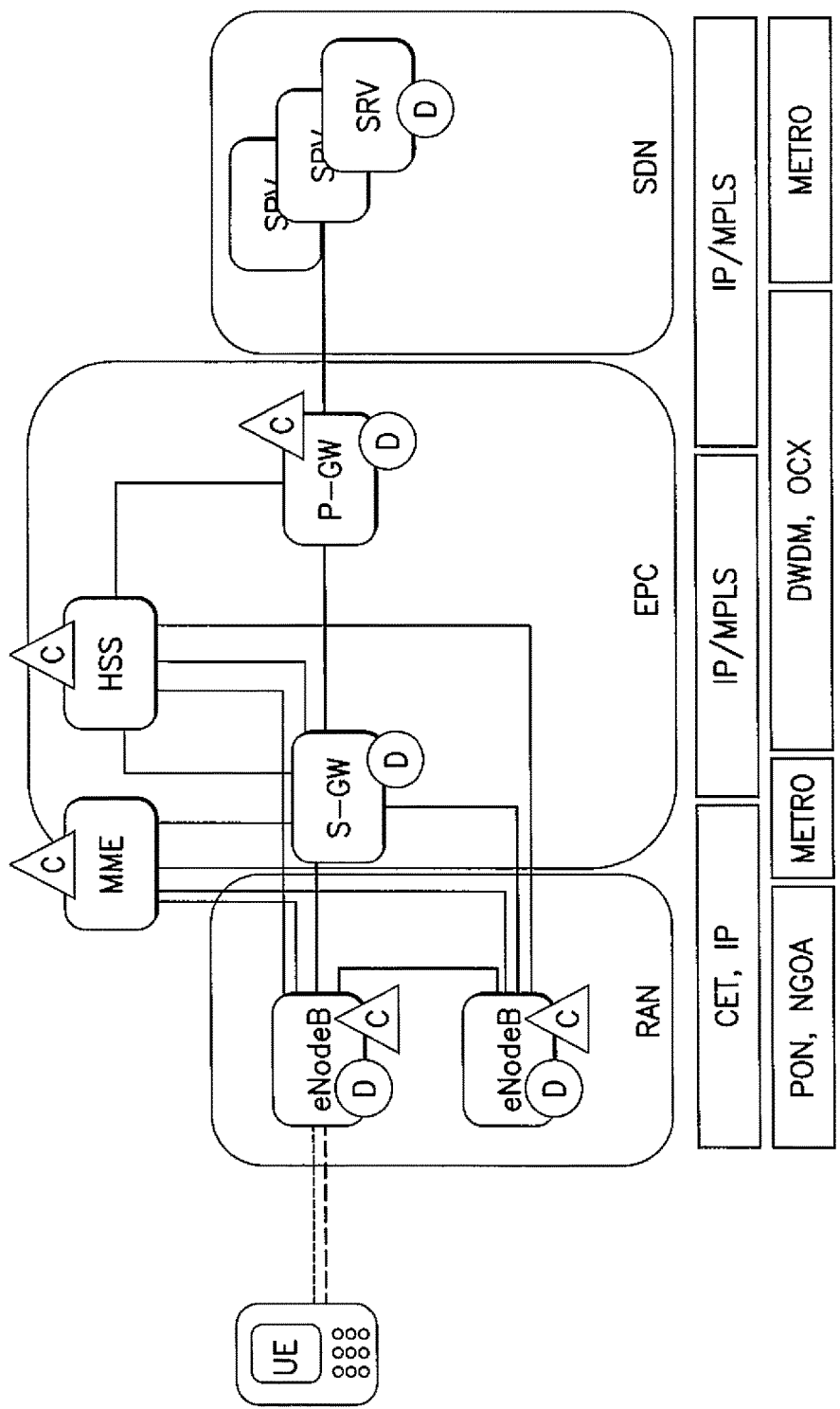
FIG. 1 shows a principle architecture of a $4^{th}$ generation mobile network.
Figure 2:
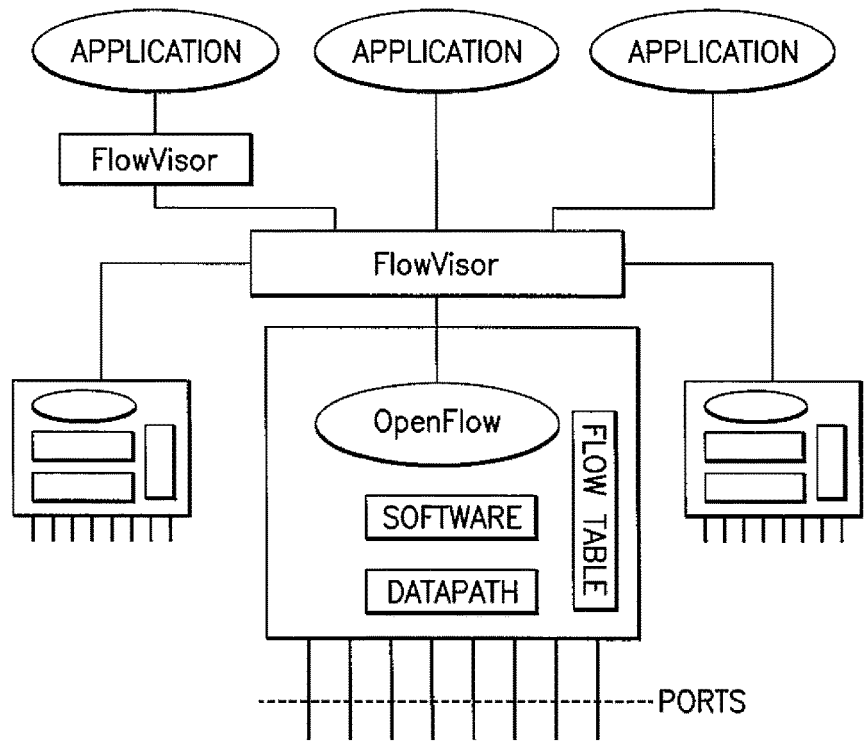
FIG. 2 shows an Openflow enabled system.
Figure 3:
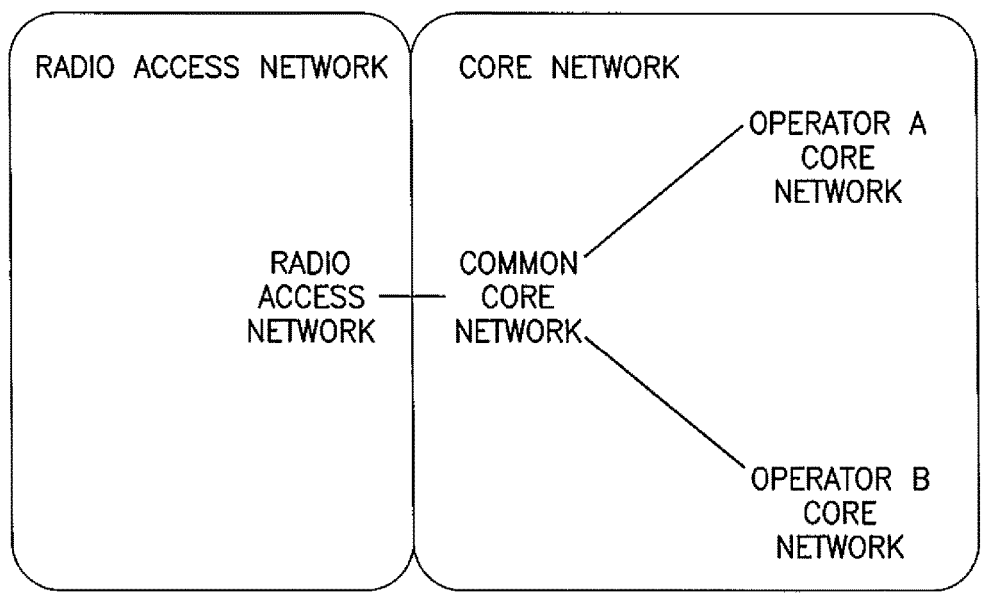
FIG. 3 shows a RAN sharing approach according to 3GPP TR 22.951.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In embodiments of this invention, operation of a mobile RAN is allowed in a way that different network operators (MNO1, MNO2), each of them operating their own distinct mobile network (PLMN1, PLMN2) will have access to network nodes of another mobile network operator (MNO A) operating another mobile network (PLMN A) in such a way that data and control dialogs (U-plane, C-Plane) and operation commands/messages (OAM) are performed as if the nodes of the other operator (MNO A) belong to the networks (PLMN 1, PLMN 2) of the different network operators (MNO1, MNO2);

different network operators (MNO 1, MNO 2) are unaware that there maybe additional operators that utilize the same nodes; and addressing schemes (PLMN IDs, TIMSI, . . . ) can be employed in the same way as they are employed in the native networks (PLMN 1, PLMN 2) when utilizing the nodes of the network (PLMN A) of the other operator.

Embodiments of the invention allow the other operator (MNO A) to (re)use his installed base of nodes in his RAN (eNodeB) without the need of modifying them by posing appropriate >>multiplexing/mediation/interworking<< functions into specific additional intermediate nodes (hereinafter also called "MMI-Box").

When sharing his mobile access resources with other operators an operator may, for example, share one base station in such a way that this single base station is seen as one accessible and configurable base station by multiple sharing operators, i.e. though it is physically existing only once it may have several logical representations.

Of course operators may group the inter working/multiplexing/mediation functions in such a way instead of one MMI box controlling one base station one MMI Box may control a number of base stations which it makes accessible for a (different) number one or more of sharing operators.

Additionally, the MMI box may be operated in such a way that it may present a number (a cluster) of base stations as a single base station to sharing operators.

One possible use case, where such a solution could be beneficial, would be a network sharing scenario, where the operator who operates the physical RAN is providing cellular access to sharing operators with service level agreement (SLA) in place that guarantee a certain quality of service (QoS) to histhe customers of the sharing operator. In this scenario the RAN operator has the flexibility to include as many base stations as he supposes sufficient to serve the SLA with the sharing operator and those may be presented as one logical base station to this sharing operator. Besides the benefit that here the RAN operator may toggle the number of base stations involved in sharing between operators, per time of day, per use or per traffic demand, he can also hide the physical representation of his base station roll out to sharing operators.

This implementation aspect may also be beneficial in sharing scenarios with overlapping coverage areas, i.e. when the coverage area of the base stations of the RAN operator is at least partly covered by the own physical RAN network of a sharing operator. In this scenario the sharing operator may whish to steer the population of his terminals to switch over to his RAN base stations whenever suitable (e.g. in order sto save costs). Flexible assignments of base stations to a sharing pool allow for coping with these breathing effects. In this case the operator operating the physical RAN may present the base stations within the overlapping coverage areas as distinct units to the sharing operator while base stations outside the overlapping coverage areas are grouped into logical base stations where each of these logical base stations comprises a plurality of physical base stations of the shared RAN.

In some embodiments of this invention, said >>adaptation/mediation<< entity is decomposed allowing to place appropriate >>adaptation/mediation<< functionality to different nodes in the network (e.g. pure data forwarding close to S-GW, etc.).

Figure 4:
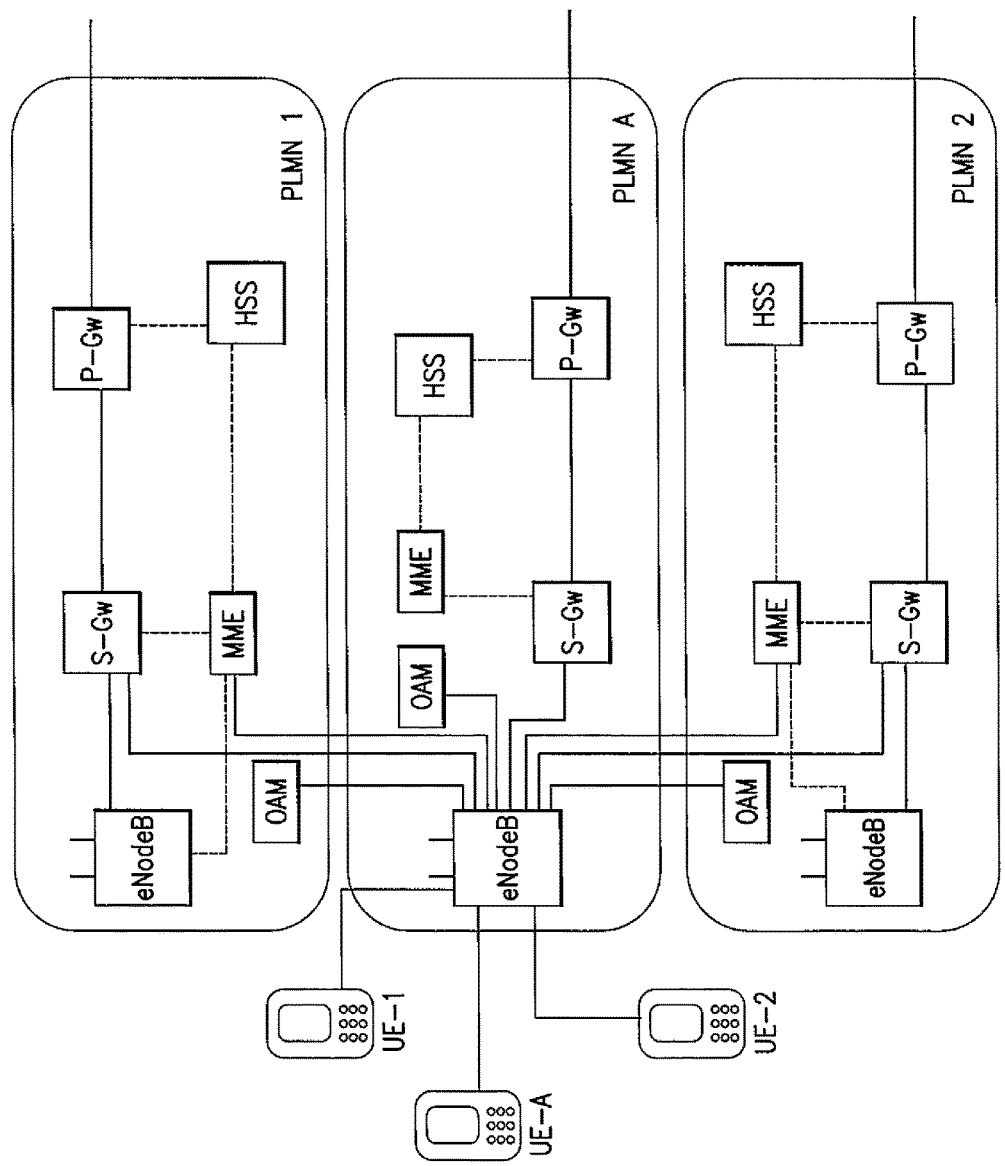
FIG. 4 shows a principle architecture that could be used in Ran sharing.
Figure 5A:
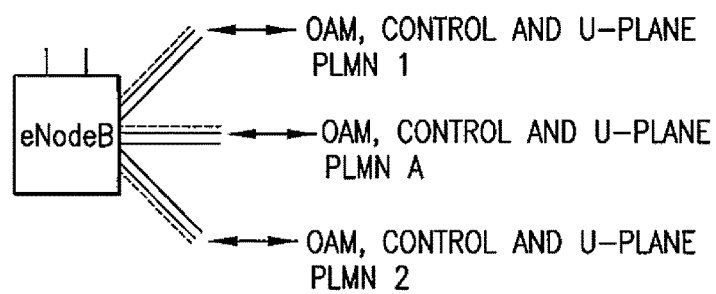
FIG. 5a shows a part of FIG. 4.

Reference is made to the example of FIG. 4 again, of which a detail comprising the eNodeB is shown in FIG. 5a. Instead of having one eNodeB that is capable of handling the demanded functionality (FIG. 5a), according to embodiments of the invention, a "traditional" eNodeB (having an interface to a single or multiple EPC) is employed which is connected to a node which handles (mediation, multiplexing, interworking) the specifics of the RAN sharing scenario (MMI-Box, see FIG. 5b).

In some embodiments, MMI-Box and eNodeB may be integrated in one network entity. Nevertheless, hereinafter, the MMI-box will be described as a specific network node from its functional point of view.

In the context of this application, providing eNodeBs for usage in the own network but also as network node of third party networks shall be denoted as network multiplexing.

The operator (MNO A) who owns and operates those eNodeBs (PLMN A) should preferably have master access (MMI-Master) for configuration of the MMI-box. The MMI-M function may communicate with a corresponding slave function MMI-S in the MMI-Box. The MMI-M may instruct the MMI-Box e.g. which third party operators are configured for usage, what their network parameters are, which service level agreements (SLA's) are in place, etc.

Figure 5B:
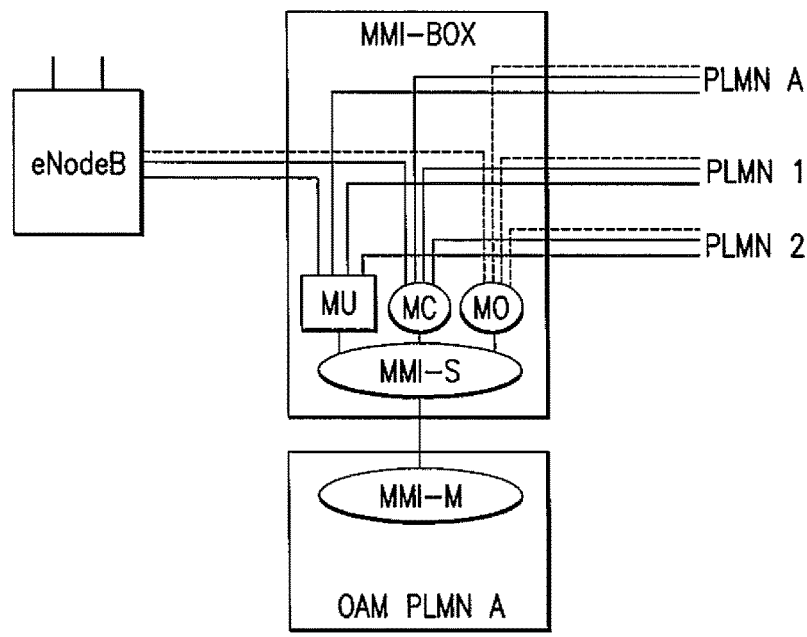
FIG. 5b shows a MMI-box according to an embodiment of the invention.

In some embodiments, the functionality to configure the network sharing part (MMI-Master, MMI-M) may be part of the PLMN Operation and Maintenance (OAM) of its owner (MNO-A) as shown in FIG. 5b, but in other embodiments, it may be separated from the OAM. If MMI-Master and MMI-slave are realized as client and server, MMI master may act as the client and MMI slave (MMI-S) as a server.

Although shown below the MMI-Box in FIG. 5b, from functional point of view the MMI-M is north of the MMI-Box as according to the usual OAM terminology.

Once configured, third party operators (PLMN1, PLMN2) may access the MMI-Box for U-plane, C-plane and OAM traffic as if it were an eNodeB node, i.e. according to some embodiments, the MMI-Box presents itself as eNodeB to third party operators eastbound and as a PLMN core (MME, S-GW) to the PLMN A eNodeB westbound for all or some of the U-plane, C-plane and OAM traffic.

In some embodiments, the MMI-Box comprises >>mediation(multiplexing/interworking<< functions for at least some of OAM (MO), C-Plane (MC) and U-Plane (MU) which are steered and configured by the MMI-S. This way, it may be guaranteed that contradicting OAM messages will be mediated into reasonable ones by the MO function (see the implementation example for PLMN-IDs below). It may also be assured that conflicting address schemes are mediated properly by respective MO, MC and MU function to forward OAM-Plane, C-plane and U-Plane traffic streams correctly to according network entities.

In the following, two functional aspects of a MMI-Box according to an embodiment of the invention should be considered at greater detail: the mediation of the U-plane (MU) and the mediation of control and OAM, respectively (MC/MO).

Figure 6:
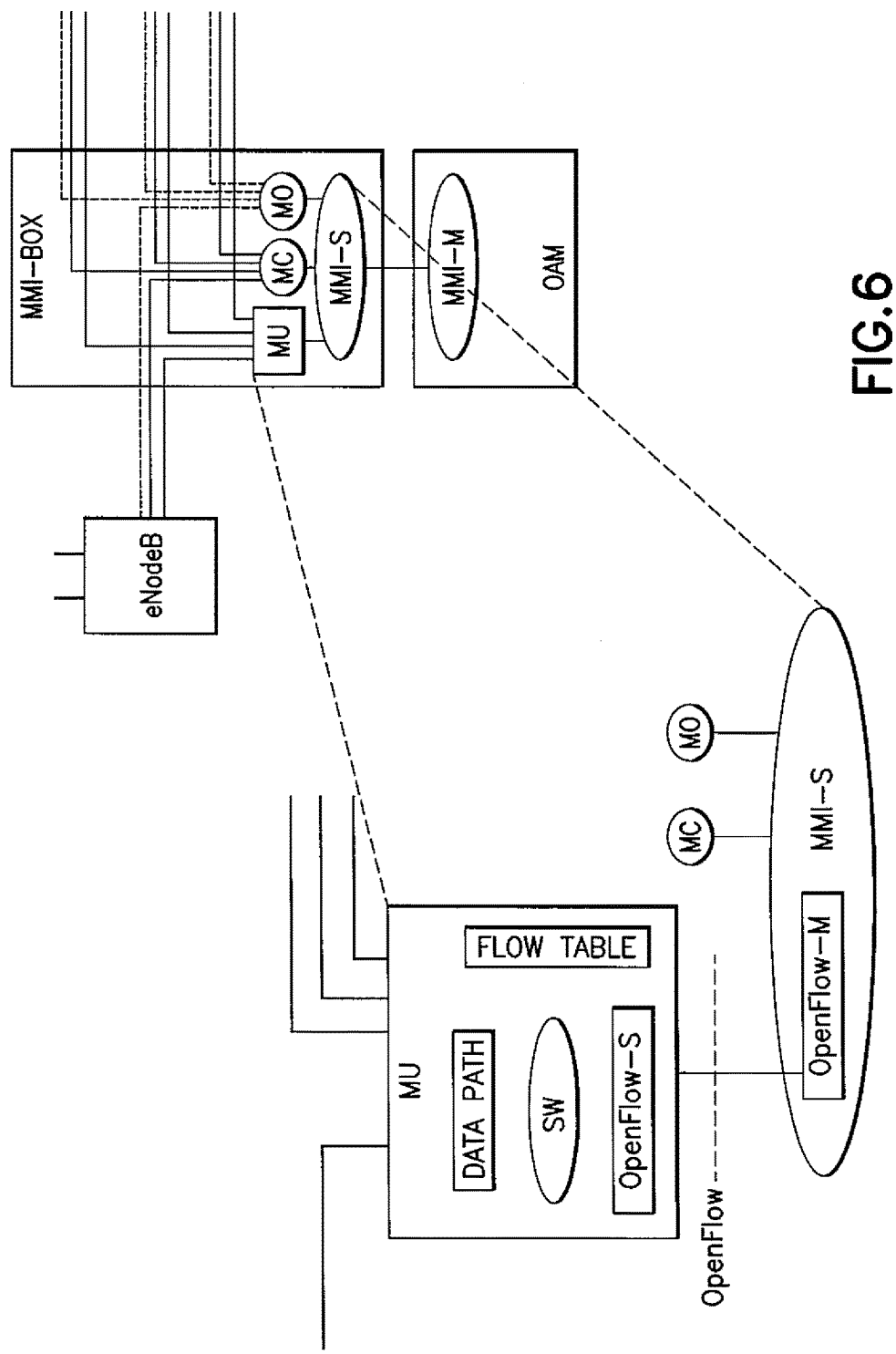
FIG. 6 shows a detail of the embodiment shown in FIG. 5b.

FIG. 6 shows a detail of the MU functionality of the MMI-Box of FIG. 5b. A main function of the MU may be mediating incoming/outgoing U-Plane traffic properly between the S-GW's of different PLMNs and the eNodeB while taking into account agreements on Quality of Service (QoS) and SLA that might be in place. MU may not care for individual user traffic. That is on behalf of the PLMN operators involved. So U-Plane traffic is rather to be seen as a bit pipe between PLMN and eNodeB, more or less data forwarding. Therefore, the focus for implementing MU may be on bandwidth and QoS, but not so much on computing power or storage. Thus, the mediation of different data streams may be beneficially be handled by technologies that are optimized for data forwarding.

OpenFlow enabled switches or routers provide this functionality: In some embodiments, the MU may be a commercially of the shelf (COTS) Ethernet switch comprising multiple I/O ports and a flow table, which stores the forwarding rules according e.g. to information found in the Ethernet header. Packets coming westbound through will be header analyzed (e.g. destination MAC address) and be forwarded to different ports assigned to different operators with priorities that are stored in the flow table. The flow table may be manipulated via an OpenFlow interface, with the master (client) function being part of the MUC-S of the MMI-Box and the slave (server) function being part of the OpenFlow switch. The master function of the openflow switch itself may be steered by a master function of the MMI-box, as discussed above.

OpenFlow switches are commercially available (including OpenFlow interface), so the MU function can be realized by those, wherein the OpenFlow resource manager (OpenFlow-Client) becoming a SW part of the MMI-Slave of the MMI-Box.

Realizing the MU this way bears the advantage that, according to some embodiments of the invention, MU (OpenFlow switch) does not have to be co-located with the eNodeB or MMI-Box, but it may also be co-located (or even become a part of) e.g. the S-GW of the EPC.

A further advantage of this approach would be that control and management functions (MC, MO), which are bandwidth uncritical may be separated from data forwarding functions which are bandwidth critical.

Another advantage is that, according to some embodiments of the invention, bandwidth critical data forwarding may be mediated in specific nodes while control and operation and management function can be done on servers, e.g. each running on an own virtual machine.

Yet another advantage is that, according to some embodiments of the invention, MMI-Box functionalities may be pooled, e.g. in such a way, that one MMI-Box is serving multiple eNodeBs.

Finally, this approach allows to scale according to different aspects: increase in traffic will require more MUs (OpenFlow switches, which can even be cascaded). Adding more sharing operators would require more virtual machines or more servers, respectively, for MO and MC, and potentially also more MUs.

In some embodiments of the invention, MO/MC mediation function may be implemented in a similar way. Generally, the control plane in mobile networks uses static configuration data (e.g. tunnel parameters, MME addresses, security credentials, . . . ) and dynamic configuration data. While static configuration data are usually configured via OAM systems, the dynamic data are typically provided via the 3GPP defined network procedures. The adaptations/mediations of the static configuration data (MO part) are done similarly as described in the following exemplary embodiment of the invention for the PLMN-ID parameter used in the cell broadcast.

Figure 7:
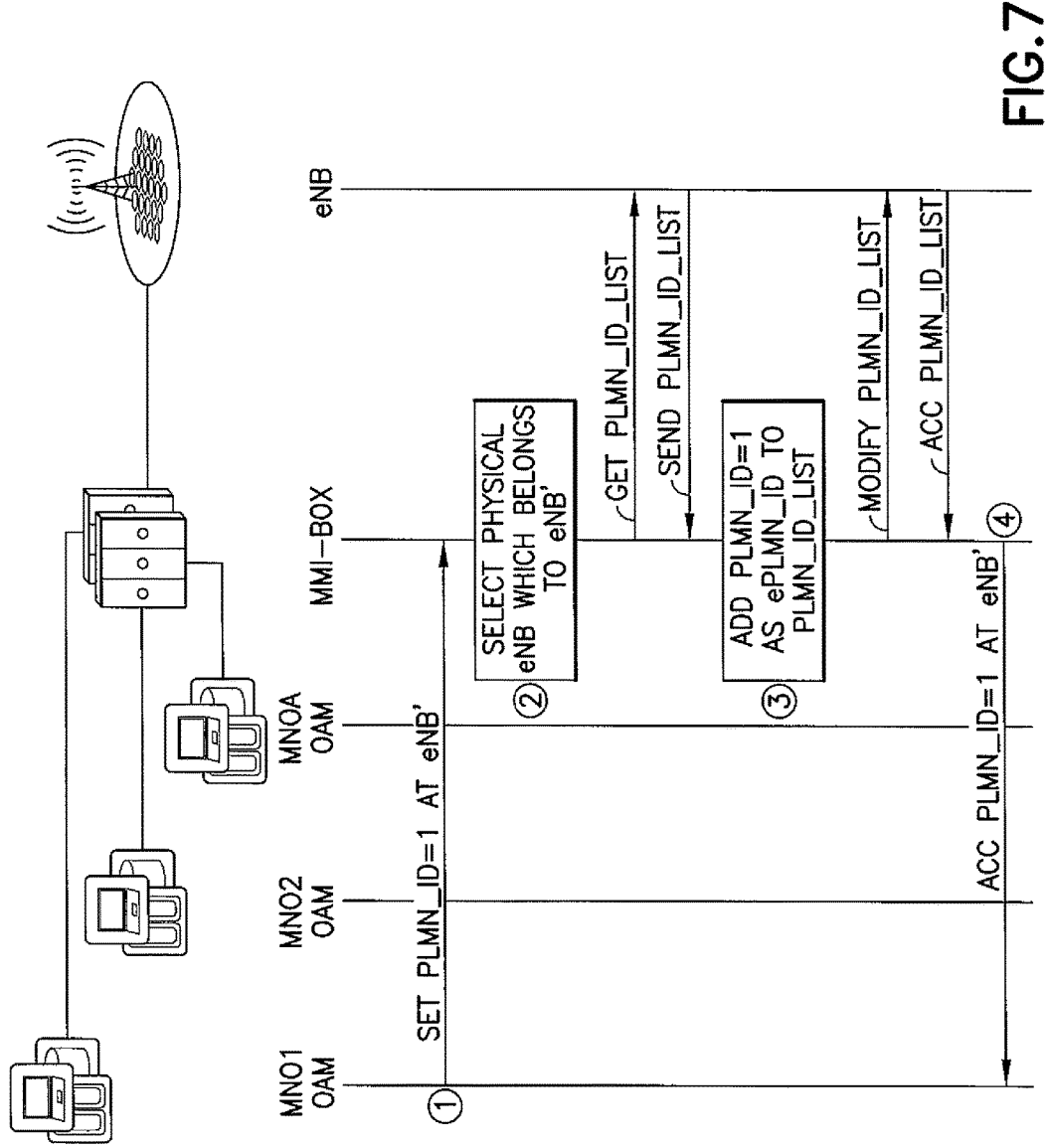
FIG. 7 shows a message flow according to an embodiment of the invention.

A base station (eNodeB, eNB) may be able to broadcast multiple PLMN-IDs. All of these PLMN-IDs have to be sent in the same broadcast message. FIG. 7 describes how the implementation may be done according to an embodiment of the invention for a radio network that is shared between 3 Operators using the MMI-Box as an >>adaptation/mediation<< function (MO) to the physical eNB.

In the embodiment, all involved MNOs have a direct OAM connection to the MMI-Box which acts as virtual eNB (marked as eNB'). The MMI-Box performs access control for each connected OAM system of a MNO and adapts/mediate with additional intelligence the configuration requests to a physical eNB in the network.

The message flow outlined in FIG. 7 is as follows:
1. MNO1 wants to set the own PLMN-ID to the virtual eNB via the owned OAM system. The OAM system connects to MMI-Box and performs the authentication and authorization procedure. After successful connection set-up the OAM system sends a set request command for the needed PLMN-ID=1 to the MMI-Box
2. The MMI-Box determines the physical eNB address and reads via get request the current PLMN-ID-List from the physical eNB.
3. The MMI-Box adds the new PLMN-ID=1 to the PLMN-ID-List and updates the list at the physical eNB via a modify PLMN-ID List command.
4. When the update of the PLMN-ID list is performed successfully the MMI-Box informs the OAM system of MNO1 about the successful configuration of PLMN-ID=1.

In case of non successful operation the request from OAM system of MNO1 is rejected with appropriate fault information. Other operators (MNO2, MNOA) may configure their PLMN-ID via their OAM systems following the same message flow. The concurrent configuration request of multiple MNOs is uncritical and can be handled by the MMI-Box using a transaction like procedure. This guarantees always consistent PLMN-ID configurations in the physical eNB.

In a corresponding way, according to some embodiments, dynamic configuration data of the C-plane may be mediated between the respective EPC's and the eNB via the MMI-Box. A dynamic configuration may happen for example in situations when current Serving-GW (S-GW) needs to be changed to redirect the U-plane traffic of an UE. (Further details see 3GPP TS 23.401). It is fair to say that not all OAM commands need to be made accessible by the operator of the MMI-box to those operators who share the RAN. For example, antenna tilt may well be a parameter that is not made available to the sharing operators. Since operators already do employ base stations of different vendors, each of those having different feature sets, those virtual eNodeBs may be integrated as eNodeBs with limited feature set into the operators OAM umbrella system.

Figure 8:
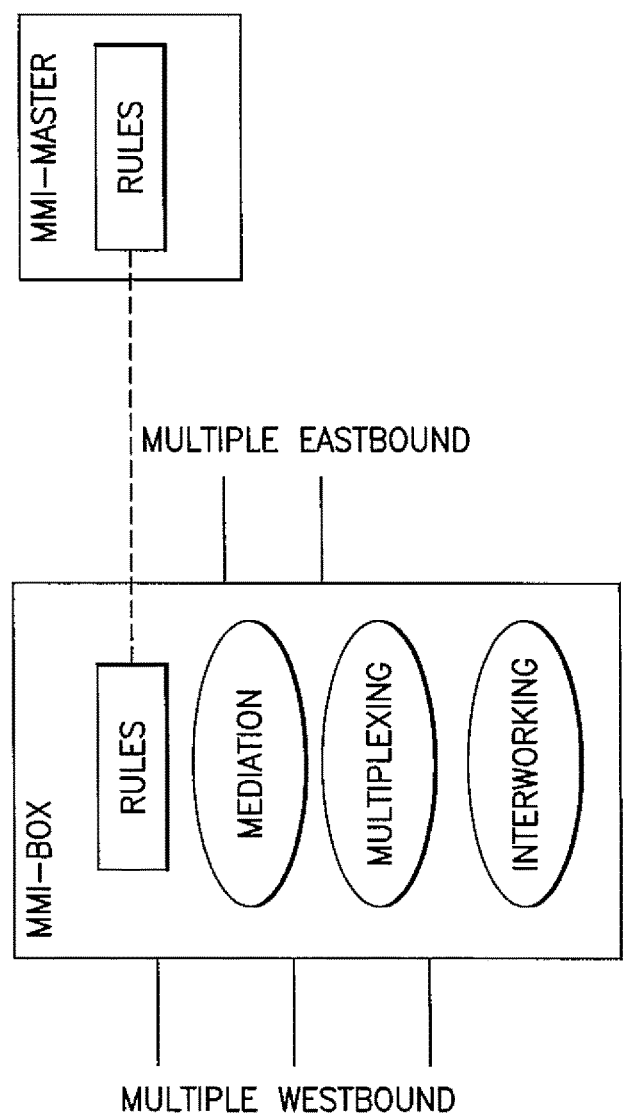
FIG. 8 shows an apparatus according to an embodiment of the invention with its integration to a master device.

FIG. 8 provides a view on an MMI-Box according to an embodiment of the invention showing three functional layers (mediating, multiplexing, interworking) of this entity. While the present embodiment employs three functional layers, in other embodiments only one or two of these layers including the multiplexing layer may be employed.

In embodiments of the invention, multiplexing is primarily required to achieve the virtualization of the shared network partitions. That is, in a case where several core networks (eastern partitions) share several radio access network elements (e.g. eNBs; western partitions), a request (or another data stream) from one of the core network elements will be multiplexed to the relevant radio access network elements. The other way round, a request (or another data stream) from one of the radio access network elements will be multiplexed to the relevant core networks sharing the RAN element. In both cases, "relevant" means those RAN elements and core networks, respectively, that are involved by this request. The multiplexing function provides the intelligence to decide which of the RAN elements and core networks, respectively, are involved by a specific request. Multiplexing functions may allow forwarding of streams or flows from westbound to eastbound and vice versa, aggregation and de-multiplexing of streams, wherein the multiplexing function does not comprise interworking or mediating as described below. Interworking functions may, in addition to the above described multiplexing functionality, guarantee that information passed over from one side (east or west) will be delivered in the expected format to the other side. For example, information, which is passed over using DIAMETER protocol on the westbound interface (interface to the RAN) may be interworked to a core network using RADIUS protocol or simply be forwarded to a core network that employs DIAMETER. Interworking thus means more than re-packaging information elements from one transport container to another. Interworking also comprises transfer of information e.g. from a connection oriented connection to a connectionless connection. In the given example, connectionless, stateless RADIUS message transfer will have to be interworked into a stateful connection oriented DIAMETER connection still leaving the payload information like AUTH_REQUEST (request for authorization) unmodified.

In another example, the RAN operator may have rolled out eNodeBs on a flat layer two (Ethernet) network, some of the sharing operators do the same on a layer three network (IP) in their home domains while other also use layer two networks. Thus the MMI-Box (interworking function) will adapt to the according transport layers. The multiplexing function may separate the different streams (sharing operators) using VLANs on layer two or using IPSec VPNs on layer three.

Another example where multiplexing functions of the MMI may be beneficial is a scenario where sharing operators are connected via a layer three network (IP) and thus employ IPSec tunnels between their core network and the eNodeBs of the RAN operator, which in this case corresponds to a tunnel between their core network and the MMI-Box. Since handling of many IPSec tunnel connections is very performance critical and thus expensive, the MMI-Box according to embodiments of the invention may aggregate several of those layer three tunnels into only one and this way relief the sharing operator from performance bottlenecks.

Mediation functions may be in some cases the most complex functions in the MMI-Box. Depending on the content of the information received eastbound or westbound, a different behavior may have to be applied which may also include a modification of the payload information itself.

For example, if several sharing operators configure different sets of PLMN-IDs, the MMI-Box will not simply pass over those to the westbound eNodeBs but make a list, which in the simplest case comprises of a set union of all received PLMN-IDs, to the eNodeBs, but only if newly received PLMN-IDs are not already in the list that was previously sent to those (see the example scenario above (FIG. 7)).

Another example that requires mediation is given by conflicting configuration messages. If two sharing operators want to configure the RF-antenna in a conflicting manner, e.g. tilt up and tilt down, then the MMI-Box may simply ignore this command but confirm the execution if necessary to the demanding sides. In the simplest way, conflicting configuration attempts from the eastbound networks may result in an intersecting set of configuration parameters for the westbound eNodeBs, e.g. if both want to tilt up or if there is only one tilt up command received, a tilt up command is sent to the eNodeB but nothing will happen in westbound direction otherwise.

According to this model, any information exchange to and from the MMI-Box from east or west may be classified into information exchange that can be passed over without any intervening, into information exchange which requires multiplexing, information exchange that requires interworking and information exchange that requires mediation. Thus the MMI-Box requires rules about how to deal with different information w.r.t. to the classification. These rules will be provided by an MMI-Master which passes over these rules to one MMI-Box or a number of MMI-Boxes. Preferably, this MMI Master is co-located or integral part of the RAN operator's configuration and management system. The MMI-Master passes the rules to the MMI-box(es) which it configures. There maybe a set of rules for inter working, multiplexing and mediation which are different for each MMI-Box connected, which may be the same or different for groups of connected core networks and which may be the same or different for connected groups of eNodeBs.

In some embodiments, interworking function and/or mediating function may be applied prior to multiplexing. In this case, multiplexing comprises selecting the appropriately interworked and/or mediated request (or other data stream). In some embodiments, the requests (or other data streams) are multiplexed first and then interworking function of mediating function is applied to the multiplexed requests according to the need of the receiver side. In still other embodiments, some mediating/interworking functions are applied before and other mediating/interworking functions are applied after multiplexing.

Figure 9:
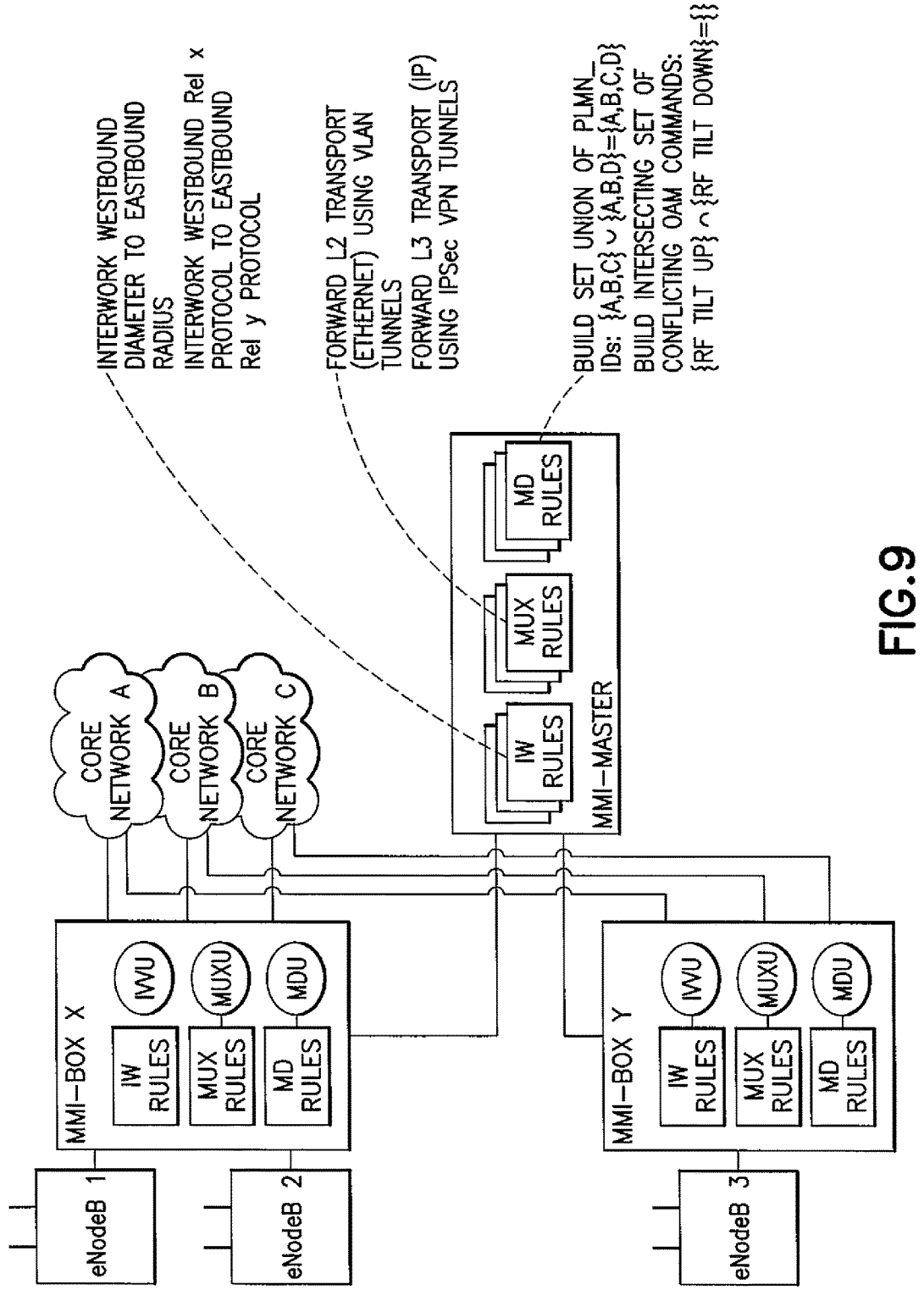
FIG. 9 shows a network scenario comprising two apparatuses according to embodiments of the invention.

FIG. 9 shows a typical field rollout employing MMI-boxes according to embodiments of the invention. Here, one MMI-Master controls two MMI-boxes, MMI-Box X, which is connected to two eNodeBs (eNodeB 1 and eNodeB 2), and MMI-Box Y which is connected to only one eNodeB (eNodeB 3). Both MMI-Boxes make all three eNodeBs accessible to all three connected core networks (core networks A, B and C). The MMI-Master defines rules for multiplexing, i.e. which requests from the core networks is directed to which eNodeB and vice versa, after they are adapted by interworking and/or mediating. The MMI-Master also defines rules for interworking, i.e. to interwork westbound DIAMETER to eastbound RADIUS, e.g. for one connected core network, and to interwork protocols of different releases in case different operators have rollouts of different releases (e.g. 3GPP). It also defines whether to use VLAN for layer two and IPSec for layer three depending on the target network. And the MMI-Master defines rules for mediation, i.e. to use set unions of PLMN IDs and to use intersecting sets for conflicting OAM commands. On the right side of FIG. 9, some exemplary rules/functions of the functionalities of the MMI master are shown.

All these rules may be different for groups of core networks, groups of eNodeBs and thus the MMI-Master may transmit several sets of rules depending on the desired MMI-Box(es) behavior.

Figure 11:
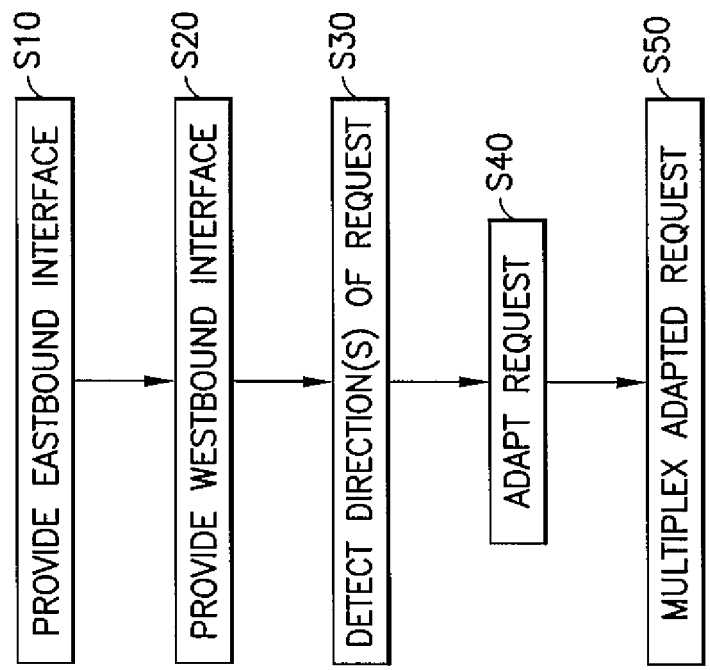
FIG. 11 shows a method according to an embodiment of the invention.
Figure 10:
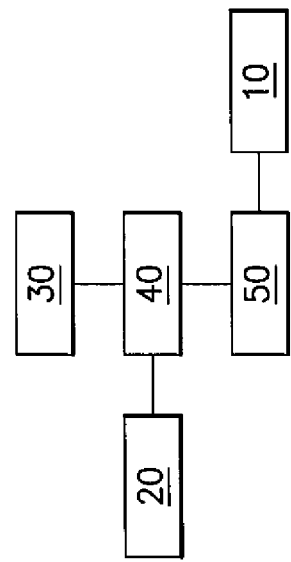
FIG. 10 shows an apparatus according to an embodiment of the invention.

FIG. 10 shows an apparatus according to an embodiment of the invention. The apparatus may be a MMI-Box. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises core interface means 10, radio interface means 20, multiplex detecting means 30, adaptation means 40, and multiplexing means 50.

The core interface means 10 provides an interface to at least two different core network elements (S10). For example, the different core network elements may belong to different mobile network operators sharing a RAN. The radio interface means 20 provides an interface to at least two different radio access network elements (S20). For example, the different radio network elements may belong to the RAN of one operator, who shares these radio access network elements with another operator.

The multiplex detecting means 30 detects where a received request is directed to (S30). For example, if a request is received at the core interface means 10, it may detect to which of the different radio access network elements interfacing the radio interface means 20 the request is to be multiplexed (sent). On the other hand, if a request is received at the radio interface 20, the multiplex detecting means 30 may detect to which of the different core network elements interfacing the core interface means 10 the request is to be multiplexed (sent).

The adapting means 40 may adapt the request according to the network element to which the request is directed (S40). Other criteria such as a status of the network element, a request previously sent to the network, and a predefined rule may be relevant for the adaptation, too. The adaptation may comprise interworking, mediating, and inhibiting from multiplexing. By the latter function, the multiplexing means 50 is inhibited from multiplexing the request or the adapted request to at least one of the receiving network elements to which the request is directed according to the multiplex detecting means 30.

The multiplexing means 50 may perform the multiplexing of the adapted request according to the detection of the multiplex detecting means 30 (S50).

Embodiments of the invention are described based on an LTE system but embodiments of the invention may be applied to UMTS or any other radio access network (e.g. GERAN, EDGE) where RAN sharing may be employed.

According to current LTE standards, up to 6 PLMNs may share an access network. However, the number of six is not a limitation for the present invention. In embodiments of the invention, any number of core networks may share a certain radio access network.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

In particular, the MMI-box may be implemented as a separate HW entity in some embodiments. However, in other embodiments, some or all components of the MMI-box may be implemented in a base station (such as an eNodeB). In some embodiments, some or all the components of the MMI-box may be implemented in one or more of the core network nodes of one or more of the sharing core networks.

In the present application, the term "request" may include requests from a first network entity (network element) to a second network entity but also the corresponding responses from the second network entity to the first network entity.

According to the above description, it should thus be apparent that exemplary embodiments of the present invention provide, for example a multiplexing apparatus, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one computing device and one or more storage mediums tangibly storing a computer program,
wherein the one or more computing device is configured with the one or more storage mediums and the tangibly stored computer program to cause the apparatus to at least:
provide a first interface to a first core network element of a first mobile network operator and to at least one second core network element of one or more second mobile network operators;
provide a second interface to one or more first radio access network elements and to one or more second radio access network elements of the first mobile network operator;
buffer a previous request until a request is received;
detect if the received request received at one of the first and second interfaces is directed to the first and/or the second of the network elements of the respective other interface;
correlate the previous request and the received request;
adapt the received request according to the network element to which it is directed by at least:
deciding if the received request requires mediating by a mediating function; and
providing the mediating function for the received request in dependence on the decision if the received request requires mediating; and
multiplex the adapted request to the first and/or the second of the network elements of the respective other interface according to the detection of the received request;
wherein one or more logical representations of the one or more second radio access network elements are presented to at least one of the second mobile network operators as radio access network elements being accessible and configurable by the at least one second mobile network operator;

wherein the mediating function for the received request is provided, for each of the one or more receiving network elements to which the received request is multiplexed, based on at least one of a status of the receiving network element, the previous request which was previously multiplexed to the receiving network element, and a predefined rule;

and wherein the mediating of the received request is based on the previous request using the correlation.

2. The apparatus according to claim 1, wherein the apparatus is caused to adapt the received request by at least:
deciding if the received request requires interworking by an interworking function;
providing the interworking function for the received request in dependence on the decision.

3. The apparatus according to claim 2, wherein
for each of the one or more receiving network elements to which the adapted request is multiplexed, the apparatus is caused to provide a transformation from a first protocol used in the received request to a second protocol different from the first protocol used in the request multiplexed to the receiving network element.

4. The apparatus according to claim 2, wherein,
for each of the one or more receiving network elements to which the adapted request is multiplexed deciding if the received request requires interworking is based on the network element from which the received request is received and on the receiving network element.

5. The apparatus according to claim 1, wherein the received request is adapted by at least:
inhibiting multiplexing of the adapted request based on at least one of a status of the receiving network element to which the adapted request is directed, the previous request which was previously multiplexed to the receiving network element, and a predefined rule.

6. The apparatus according to claim 1, wherein,
for each of the one or more receiving network elements to which the adapted request is multiplexed, providing the mediating function for the received request is based on the network element from which the received request is received and on the receiving network element.

7. The apparatus according to claim 1 wherein
the received request is mediated such that the first and second radio access network elements jointly appear as a single first virtual radio access network element to the first core network element, wherein the request is a request to be multiplexed between the first core network element and at least one of the first and second radio access network elements.

8. The apparatus according to claim 1, further comprising:
interface means adapted to provide an interface to a master managing device;
managing means adapted to manage at least one of the multiplex detecting means, the adapting means, and the multiplexing means based on a managing request from the master managing device;
wherein the master managing device provides one or more sets of rules for handling information exchange between one or more core network elements and one or more radio access network elements.

9. A method comprising:
providing a first interface to a first core network element of a first mobile network operator and to at least one second core network element of one or more second mobile network operators;
providing a second interface to one or more first radio access network elements and to one or more second radio access network elements of the first mobile network operator;
buffering a previous request until a request is received;
detecting if the received request received at one of the first and second interfaces is directed to the first and/or the second of the network elements of the respective other interface;
correlating the previous request and the received request;
adapting the received request according to the network element to which it is directed by at least:
deciding, if the received request requires mediating by a mediating function; and
providing, the mediating function for the received request in dependence on the decision if the received request requires mediating;
multiplexing the adapted request to the first and/or the second of the network elements of the respective other interface according to the detecting;
wherein one or more logical representations of at least the second radio access network elements are presented to at least one of the second mobile network operators as radio access network elements being accessible and configurable by the at least one second mobile network operator;
wherein the mediating function for the received request is provided, for each of the one or more receiving, network elements to which the received request is multiplexed, based on at least one of a status of the receiving network element, the previous request which was previously multiplexed to the receiving network element, and a predefined rule;
and wherein the mediating of the received request is based on the previous request using the correlation.

10. A computer program product comprising:
a non-transitory computer readable medium encoded with processor executable code that when executed causes an apparatus to:
provide a first interface to a first core network element of a first mobile network operator and to at least one second core network element of one or more second mobile network operators;
provide a second interface to one or more first radio access network elements and to one or more second radio access network elements of the first mobile network operator;
buffer a previous request until a request is received;
detect if the received request received at one of the first and second interfaces is directed to the first and/or the second of the network elements of the respective other interface;
correlate the previous request and the received request;
adapt the received request according to the network element to which it is directed by at least:
deciding if the received request requires mediating by .a mediating function; and
providing the mediating function for received request in dependence on the decision if the received request requires mediating;
multiplex the adapted request to the first and/or the second of the network elements of the respective other interface according to the detecting;
wherein one or more logical representations of at least the second radio access network elements are presented to at least one of the second mobile network operators as radio access network elements being accessible and configurable by the at least one second mobile network operator;

wherein the mediating function for the received request is provided, for each of the one or more receiving network elements to which the received request is multiplexed, based on at least one of a status of the receiving network element, the previous request which was previously multiplexed to the receiving network element, and a predefined rule;

and wherein the mediating, of the received request is based on the previous request using the correlation.

11. The apparatus according to claim 1, wherein the logical representations are configured according to at least one of:

a service level agreement between the first operator and the at least one second operator, and the overlap of coverage areas of the first and the at least one second operator.

12. The apparatus according to claim 1, wherein providing the mediating function for the received request comprises resolving conflicting configuration messages received in requests from the first mobile network operator and/or requests from second mobile network operators.

13. The apparatus according to claim 1, wherein:

operation and maintenance commands from the at least one second mobile network operator regarding the presented radio access network elements comprises a limited feature set sufficient for integrating the presented radio access network elements into the operation and maintenance system of the at least one second mobile network operator.

14. The apparatus according to claim 1, wherein the apparatus presents itself as a base station on the first interface to the second core network elements of the one or more second mobile operators.

* * * * *

UNITED STATES PATENT AND TRADEMARK OFFICE
CERTIFICATE OF CORRECTION

| | | |
|---|---|---|
| PATENT NO. | : 9,615,318 B2 | |
| APPLICATION NO. | : 14/345428 | |
| DATED | : April 4, 2017 | |
| INVENTOR(S) | : Hans-Jochen Morper and Christian Markwart | |

It is certified that error appears in the above-identified patent and that said Letters Patent is hereby corrected as shown below:

In the Claims

In Claim 10:
Column 20, Line 59, "received" should be deleted and --the received-- should be inserted.

Signed and Sealed this
Thirtieth Day of May, 2017

Michelle K. Lee
*Director of the United States Patent and Trademark Office*